United States Patent [19]

Heijnemans

[11] Patent Number: 4,566,756
[45] Date of Patent: Jan. 28, 1986

[54] PROJECTION SCREEN
[75] Inventor: Werner A. L. Heijnemans, Eindhoven, Netherlands
[73] Assignee: U.S. Philips Corporation, New York, N.Y.
[21] Appl. No.: 565,564
[22] Filed: Dec. 27, 1983
[30] Foreign Application Priority Data Mar. 7, 1983 [NL] Netherlands ............... 8300817

[51] Int. Cl.4 ............................................. G03B 21/60
[52] U.S. Cl. ...................................... 350/126; 350/128
[58] Field of Search ............... 350/117, 123, 126–128, 350/167, 263; 428/114, 167, 294, 325, 327

[56] References Cited
U.S. PATENT DOCUMENTS 1,943,995  1/1934  Weld ..................................... 350/128
2,338,654  1/1944  MacNeille ........................... 350/128
3,523,717  8/1970  Glenn, Jr. ............................ 350/123
3,679,451  7/1972  Marks et al. ..................... 350/126 X
4,379,617  4/1983  Funakoshi et al. ................. 350/126
4,443,814  4/1984  Mori et al. ........................... 350/127

Primary Examiner—L. T. Hix
Assistant Examiner—Della J. Rutledge
Attorney, Agent, or Firm—Joseph P. Abate

[57] ABSTRACT

A projection screen comprises a single plate of a transparent material. The diffusion in the horizontal direction is provided by filamentary particles which are oriented substantially in one direction in the plate material. Both surfaces of the plate are then capable of performing different functions, yielding a projection screen with an optimally uniform brightness distribution, minimal color faults and maximum contrast.

9 Claims, 10 Drawing Figures

PROJECTION SCREEN

BACKGROUND OF THE INVENTION

The invention relates to a projection screen, in particular for a color-television projection system, which screen comprises a single plate of a transparent material having a first and a second surface and provided with light diffusers, the second surface being intended to be directed towards an audience. The invention also relates to a projection system employing such a projection screen and to a method of manufacturing the screen.

Such a projection screen for the reproduction of a picture projected by an image source may be employed for the projection, generally on an enlarged scale, of films, commercials or television pictures and is described inter alia in European Patent Application No. 0,051,977 to which U.S. Pat. No. 4,443,814 corresponds.

The quality of a picture displayed by means of a projection system largely depends on the optical properties of the projection screen used. The picture formed by means of such a projection screen must be such that a large viewing range is obtained in the horizontal direction. In the vertical direction, the viewing range is generally smaller. The brightness distribution must be as uniform as possible over the entire picture regardless of the angle at which the picture is viewed by the audience. When the screen is used in a color-television projection arrangement employing three in-line cathode ray tubes for the primary colors red, green and blue a change in position of the viewer or a change in viewing angle should not lead to color-shifting in spite of the fact that the three beams which are projected at the same point are incident at different angles. Finally, the picture must have maximal brightness and maximal contrast.

The light diffusion necessary for a large horizontal viewing range can be obtained by means of a structure of adjacent cylindrical lenses whose cylinder axes extend in a vertical direction, which structure is provided on one surface of the screen. This always requires use of a Fresnel lens structure in order to ensure that the light from the image source falls onto the screen substantially perpendicularly. This Fresnel lens may be arranged on the rear surface of the projection screen, i.e. the surface which faces the image source. The advantage of such a single element screen is that it is comparatively inexpensive. However, this screen also has some disadvantages. Firstly, interference of the Fresnel lens with said cylindrical-lens structure gives rise to Moiré effects. Furthermore, the picture obtained by means of the projection screen exhibits poor contrast because the front of the screen reflects much ambient light towards the audience. Moreover, one of the surfaces is generally matt, giving rise to a further deterioration of the contrast. Finally, color faults may arise in the case of three-color projection with separate projection axes for these colors.

A substantial improvement in contrast can be achieved by arranging the horizontally diffusing lens structure on the rear surface of the screen and by arranging absorbing strips on the front of the screen outside the focal lines formed by the lens structure. The Fresnel lens must then be arranged on a separate carrier. One surface of this carrier may be matt to obtain some light diffusion in the vertical direction.

The disadvantages of this two-element projection screen are that Moiré effects may occur as a result of interference between the vertical cylindrical-lens structure and the Fresnel lens and that the price is comparatively high because of the use of two plates.

The afore-mentioned European Patent Application No. 0,051,977, describes a projection screen for color-television projection comprising a single plate. Both surfaces of this plate are formed by a two-dimensional lenticular structure. The corresponding lenses on the front and the rear of the plate have a common or a substantially common optical axis, the focal point of each lens on the rear of the plate being disposed on the surface of the corresponding lens on the front of the plate and vice versa. Since the projection screen comprises only one element, it is in principle inexpensive. As no Fresnel lens is used no Moiré effect will occur. The two-dimensional lenticular structure on the rear of the screen concentrates the projected light in small focal points, so that a satisfactory contrast can be obtained by providing those surface portions of the lens through which no light emerges with an absorbing coating. The quality of this projection screen with respect to the uniformity of the brightness, color shifting, and color shading is slightly better than that of the afore-mentioned other projection systems but is not yet satisfactory. Moreover, forming the desired profiles in the moulds or rollers by means of which the projection screen is to be manufactured is very difficult, so that ultimately the projection screen is still very expensive.

Color shifting is defined as the change of color in the centre of the screen if the position of the viewer changes. Color shading is defined as the color difference between the center and the edges of the projection screen observed by a viewer whose line of view is perpendicular to the screen centre. Color shading occurs when lenses with large field-angles are used, which lenses are required if the projection system is to be accommodated in a cabinet of small volume.

SUMMARY OF THE INVENTION

It is the object of the present invention to provide a single-element projection screen which is simple and easy to manufacture and which provides a picture which has a brightness which is as uniform as possible, which exhibits minimal color-shifting and color shading, which provides optimum contrast, and which does not exhibit Moiré effects. To this end, the projection screen according to the invention is characterized in that the light diffuser for diffusing the light in a first direction comprises filamentary particles in the plate substrate, which particles are made of a material with a refractive index which differs from that of the substrate material and are oriented substantially in a second direction transverse to the first direction.

Since, for the horizontal light diffusion, this projection screen does not employ a lenticular structure on the screen surface but a diffuser inside the screen, both surfaces of this single-element screen remain available for other functions. The screen can be manufactured in a simple manner. The diffuser inside the screen must provide a substantial diffusion of the light in one direction (the horizontal direction), while in the direction transverse thereto only a minimal light diffusion is allowed. Because the diffuser provides a Lambert brightness distribution for each color in the horizontal direction, it is achieved that the picture obtained by means of the screen covers a large viewing range, that no color faults occur and that no Fresnel lens is required.

It is to be noted that a plastics plate in which glass fibres are incorporated which act as light diffusers is disclosed in German Patent Application No. 2,531,240, which has been laid open to public inspection. The glass fibres in the known sheet, which are comparatively short, are oriented at random, so that a uniform brightness distribution is obtained. This plate is suitable for use as a screen in measuring and test equipment but not as a screen for large-screen projection, because the light would then also be diffused over too large a range in the vertical direction and would be inadequate for the viewer.

In addition to the substantial diffusion in the horizontal direction, the diffuser in the substrate can also produce some, though substantially smaller, vertical diffusion. This vertical diffusion may be adequate under certain conditions. However, preferably the vertical diffusion is provided by additional means.

A first embodiment of the projection screen is further characterized in that the substrate comprises a second diffuser in the form of a multitude of substantially spherical particles of a material having a refractive index which differs from that of the substrate material.

The second diffuser diffuses a small part of the light substantially uniformly in all directions, while the first diffuser diffuses most of the light in the horizontal direction.

An improved vertical diffusion is obtained with a preferred embodiment of the projection screen which is characterized in that the first surface is provided with a first structure of adjacent cylindrical lenses which extend in the first direction.

As a result of the desired strong directivity or small diffusion angle in the vertical direction, "hot-spotting" may occur in this direction. In other words certain points in the projected image, which points are situated on the connecting line between the viewer's eye and the exit pupil of the projection lens, are brighter than other points, which "hot-spots" move as the viewer moves.

A first embodiment of the projection screen which substantially eliminates the "hot-spot" effect is characterized in that a Fresnel cylindrical lens is superimposed on the first structure of cylindrical lenses.

A second embodiment of the projection screen without the "hot-spot" effect is characterized in that the second surface is provided with a second structure of adjacent cylindrical lenses which extend in the first direction, each cylindrical lens of the second surface being associated with a cylindrical lens of the first surface and the focus of a cylindrical lens of one of the plate surfaces being situated on the surface of the associated cylindrical lens of the other plate surface.

Preferably, a projection screen whose first surface carries a first cylindrical-lens structure is further characterized in that the strips of the second surface outside the focal lines of the cylindrical lens structure are light absorbing. The picture formed be means of this projection screen exhibits a very good contrast.

Apart from being used in a transmissive projection screen, for which the image source and the viewer are situated at different sides of the screen, the invention may also be used in a reflective projection screen, for which the image source and the viewer are disposed at the same side of the screen. An embodiment of such a projection screen is characterized in that the second surface is provided with a structure of adjacent cylindrical lenses which extend in the first direction and whose focal lines are situated on the first surface, and the areas on the first surface at the location of the focal lines are reflecting in the direction of the second surface, while the areas of the first surface situated between the focal lines are absorbing.

The invention also relates to a color-television projection system comprising a color television receiver, three cathode ray tubes which are arranged in-line and for each of which there is provided a projection lens, and a projection screen.

Another aspect of the invention concerns the comparatively simple and inexpensive method of manufacturing the projection screen. This method may be characterized in that filamentary particles of a transparent material are introduced into a liquid transparent material, this mixture is formed into a plate by means of an extrusion process, known per se, during which process the filamentary particles are aligned.

During the actual extrusion process, a structure of cylindrical lenses may be formed on this plate by using a roller in which a structure corresponding to the desired cylindrical-lens structure is formed.

Alternatively, a cylindrical lens structure may be formed on a plate surface after the extrusion process by depositing a layer of a soft plastics on said surface, applying a die whose surface is the mirror-image of the cylindrical-lens structure to be formed into said layer, allowing the layer to cure and removing the die.

The projection screen can also be manufactured by introducing filamentary particles into a soft curable plastics, and allowing the plastics to cure.

The invention will now be described in more detail, by way of example, with reference to the drawings.

DESCRIPTION OF THE PREFERRED EMBODIMENTS

Figure 1:
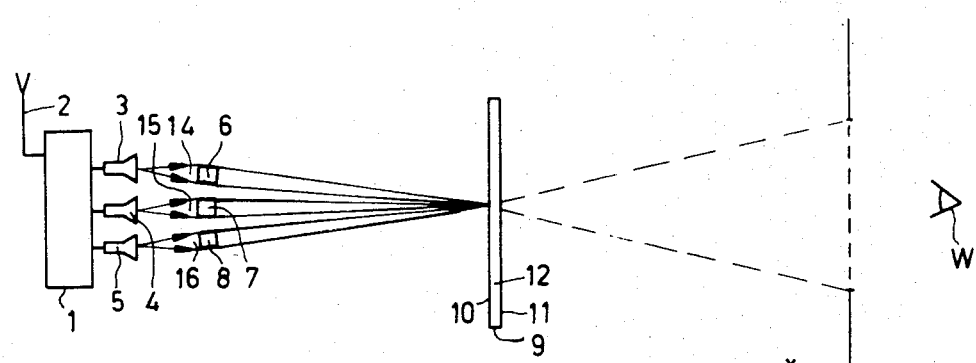
FIG. 1 shows a color television projection system comprising a single-plate projection screen.

The color-television projection system shown in FIG. 1 comprises a color television receiver 1 which receives a color television signal on its input, for example an aerial 2, and divides this signal into a red, a green and a blue signal. These signals are applied to cathode-ray tubes 3, 4 and 5 (connected to the receiver 1) on whose luminescent screens a red, a green and a blue picture appear. These pictures are projected onto the projection screen 9 by the associated projection lenses 6, 7 and 8, shown schematically. The projection screen 9 comprises a rear surface 10 directed towards the image sources 3, 4 and 5 and a front surface 11 directed towards the viewer w. The substrate of the plate is designated 12. In the screen 9 the light of the beams 14, 15 and 16 is diffused through a comparatively wide angle in the y-direction, while the light is diffused through a smaller angle in the z-direction, not indicated, which is perpendicular to the x and the y-direction. As a result of this, the viewer w can observe a picture in the viewing plane 13, which picture is a superposition of the enlarged images formed by the cathode-ray tubes 3, 4 and 5.

It is to be noted that the projection system is shown very schematically in FIG. 1. In practice, mirrors will be interposed between the cathode-ray tubes 3, 4 and 5 and the projection screen 9, which mirrors "fold" the radiation path so as to enable the projection system to be accommodated in a cabinet of comparatively small depth.

Figure 2:
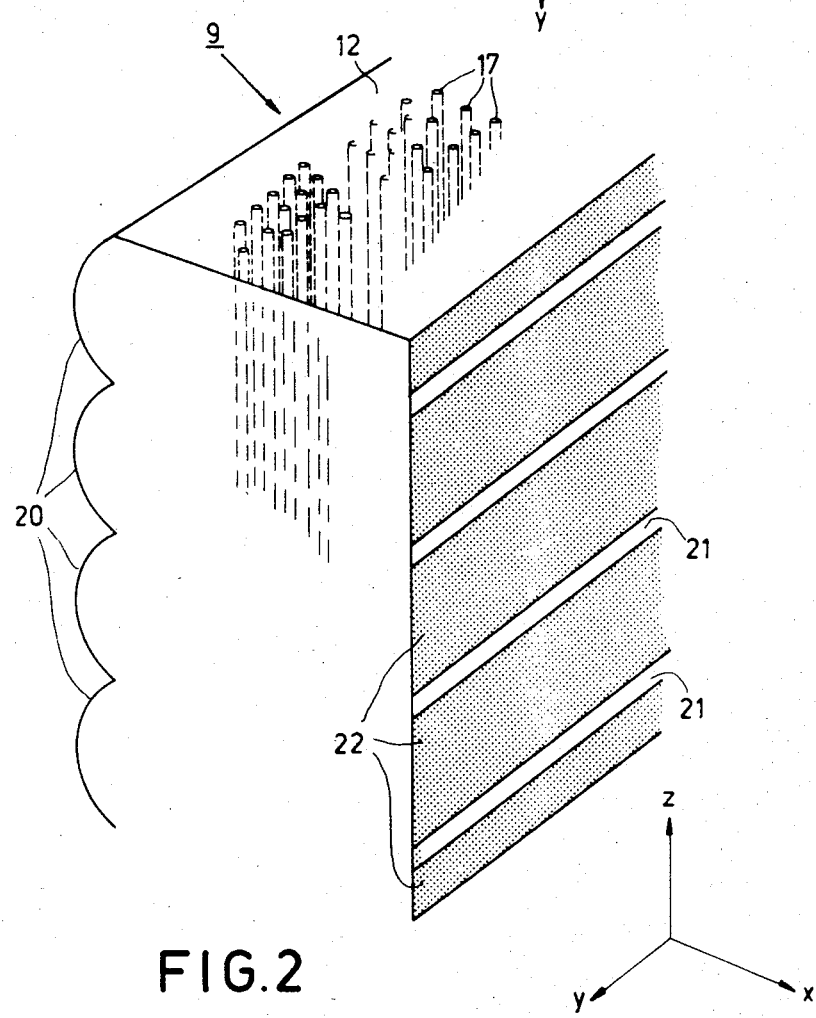
FIG. 2 is a perspective view of this projection screen in a first embodiment.

FIG. 2 is a perspective view of a small part of a first embodiment of the projection screen in accordance with the invention, which screen may be used in the projection system shown in FIG. 1. The substrate 12 of this screen contains a multitude of filamentary particles or fibers 17 whose refractive index differs slightly from that of the substrate. The substrate may be, for example, polymethylmethacrylate having a refractive index $n_1 = 1.49$ and the fibres may be glass fibres with a higher refractive index $n_2$, such that the difference between the refractive indices $\Delta n = n_1 - n_2$ is, for example, 0.1. The fibres have a thickness of some tens to some hundreds of micrometers and extend in the z-direction. These fibres diffuse the light through the desired angle of, for example, $2 \times 80°$ in the y-direction. The fibres 17 may be arranged in layers. It has been found that the desired effect is already achieved when 10 layers are used. The fibres need not extend over the entire height, in the z-direction, of the screen, but may comprise shorter portions arranged one after the other. It is only essential that the length of the fibres is great relative to their diameter and that the fibres are oriented mainly in the z-direction.

Figure 3:
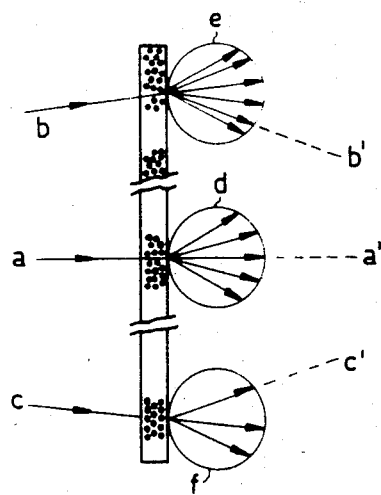
FIG. 3 represents the light diffusion produced by said projection screen.

As a result of the large number of fibres per layer and the large number of fibre layers the substrate diffuser acts as a perfect diffuser in the horizontal direction (or y-direction). The brightness distribution caused by this diffuser is a Lambert or uniform distribution, as is illustrated in FIG. 3. This figure shows how a beam a, which is incident on the center of the screen, and two beams b and c, which are incident, non-perpendicularly, at the edges of the screen, are diffused. After the passage through the screen, the light of the three beams a, b and c is distributed as indicated by the envelopes d, e and f. The lengths of the arrows within the envelopes are proportional to the intensities in the directions indicated by said arrows. For each of the three beams, the brightness distribution is symmetrical. For a viewer situated at the comparatively large distance from a screen, the lengths of the arrows, which are directed towards him from different points on the screen, are substantially equal, so that the viewer sees a picture of fairly uniform brightness.

Figure 4:
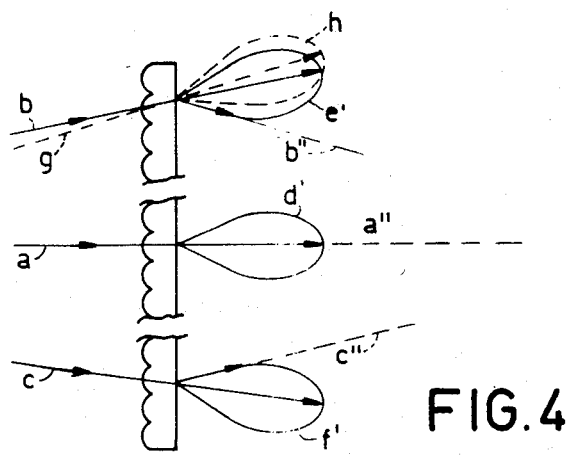
FIG. 4 represents the light diffusion produced by a known projection screen.

For comparison, FIG. 4 represents the situation which occurs when a projection screen is used with a horizontal light diffuser in the form of a structure of cylindrical lenses on the rear of the screen. The envelopes d', e', and f' are now asymmetrical and a substantial portion of the diffused light is concentrated within a small angle. The directions of maximum brightness differ for the beams b and c. The light which is directed towards the viewer w from the edges of the screen, see the arrows b" and c", is less bright than the light, indicated by arrow a", from the center of the screen. The viewer now sees a picture which is less bright at the edges than in the center. When the position of the viewer changes the brightness distribution in the picture observed by him will also change.

When the projection screen shown in FIG. 4 is used color faults will occur. Beams originating from different cathode-ray tubes 3, 4 and 5 in FIG. 1 and directed at the same point on the screen will be incident on this screen at different angles, as is indicated for the beams b and g in FIG. 4. The envelope h of the intensity distribution for the beam g, after passage through the screen, has a direction other than that of the beam b. As a result of this effect, the color of a specific point on the screen will depend on the position of the viewer and the angle at which the point is observed.

In practice, a projection screen as shown in FIG. 4 must be combined with a Fresnel lens, which ensures that all beams are perpendicularly incident on the screen. This yields a uniform brightness of the picture. The projection screen as shown in FIG. 2 does not require the use of such a lens.

In addition to a substantial diffusion in the horizontal direction some, though a smaller, degree of diffusion in the vertical direction is required. This diffusion can be obtained in various ways. Firstly, the fibres 17 in the substrate 12 also produce some diffusion in the vertical direction. Moreover, a surface of the screen can be matted, so that this surface acts as a diffuser. In practice, a combination of these possibilities is preferred.

Figure 5:
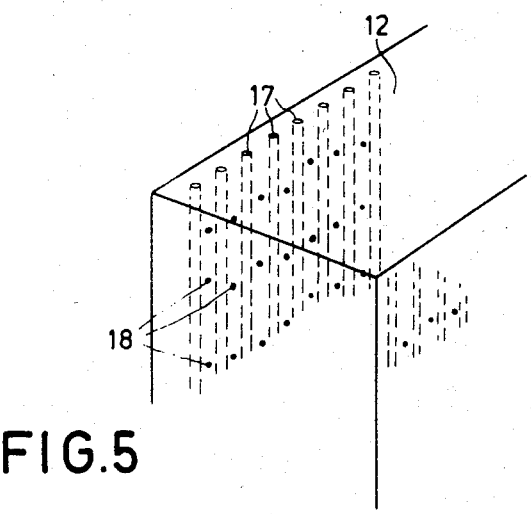
FIG. 5 is a perspective view of a part of a second embodiment of the projection screen.

Another possibility for obtaining diffusion in the vertical direction is by means of isotropically diffusing particles in the substrate, as shown in FIG. 5. For the sake of clarity, this figure shows only one layer of fibres and one layer of particles 18. The particles 18 are preferably spherical and of a material having a refractive index which differs from that of the substrate 12. The number of particles 18 per volume unit is comparatively small, so that they diffuse only a small part of the light, namely, in arbitrary directions including the vertical or z-direction. The projection screen with isotropically diffusing particles may also have a matt surface.

Preferably, the vertical diffusion is obtained by means of a structure of cylindrical lenses 20 which extend in the horizontal direction, as shown in FIG. 2. Each of these lenses concentrates the light which is incident on it and which originates from the picture sources 3, 4 and 5 in a corresponding focal line 21 and ensures that the emergent beam diverges.

As the image sources 3, 4 and 5 are arranged in-line in the y-direction, the focal lines for the colors red, green and blue will be superimposed. The focal lines obtained by means of the projection screen shown in FIG. 2 are much narrower than those obtained with a projection screen provided with the structure of cylindrical lenses which extend in the vertical direction, which structure was used in order to obtain a horizontal light distribution. As a result of this, the areas or the strips 22, between the focal lines 21, which can be blackened or made absorbing can be larger for the screen shown in FIG. 2 than for previously proposed projection screen. Consequently, the contrast of a picture obtained with the present projection screen is substantially better than that of a picture obtained with a projection screen with cylindrical lenses which extend in the vertical direction.

The strips 22 between the focal lines 21 can be blackened photographically. If the front surface of the screen is constructed so that the strips 22 are situated at a higher level that the narrow strips where the focal lines 21 are formed, the strips 22 can be blackened comparatively simply by means of a rolling or printing technique for black ink or an application technique for black plastics.

Figure 6:
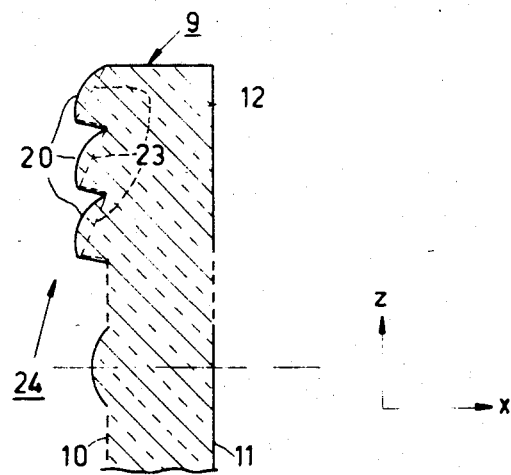
FIG. 6 is a vertical sectional view of a part of a third embodiment of the projection screen.

In order to ensure that a viewer can observe a sufficiently bright picture, despite the diffusion through a large angle in the horizontal direction, the diffusion angle in the vertical direction must be limited. In practice, values between $2° \times 10°$ and $2° \times 20°$ are adopted for the vertical diffusion angle. As a result of the desired strong directivity in the vertical or z-direction, "hot-spotting" may occur in this direction in a similar way as described for the y-direction with reference to FIG. 4. Hot-spotting in the z-direction can again be eliminated by means of a separate Fresnel lens arranged in the light path before the rear surface of the projection screen. However, in accordance with the present invention, it is preferred to form a lens structure on the rear surface of the projection screen, which structure is a superposition of the cylindrical lens structure shown in FIG. 2 and a Fresnel cylindrical lens. In FIG. 6, which is a vertical sectional view of a part of the present embodiment of the projection screen, the composite lens structure is designated 24 and the Fresnel lens is indicated by the broken lines. The angles which the slopes 23 of this Fresnel lens make with the z-direction are maximal at the edges of the screen and are substantially zero in the center. The Fresnel lens ensures that the chief rays of beams which are obliquely incident on the screen are also parallel to the x-direction after passage through the screen.

Figure 7:
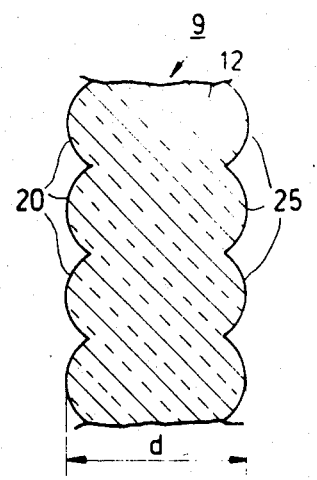
FIG. 7 is a vertical sectional view of a part of a fourth embodiment of the projection screen.

A very attractive method of eliminating the "hot-spot" effect is to provide the front surface of the projection screen with a second cylindrical-lens structure identical to that on the rear surface of the screen. FIG. 7 is a vertical sectional view of a small part of such a projection screen. The cylindrical lenses 25 on the front of the screen are identical to and are located at the same level as the cylindrical lenses 20 on the rear of the screen. The thickness d of the screen 9 and the curvatures of the cylindrical lenses are adapted to each other in such a manner that the surfaces of the associated lenses are situated in or near each other's focal points. The direction of an emergent beam in then sufficiently independent of the direction of incidence of the original beam on the screen.

By means of the projection screen shown in FIG. 7, an image of the exit pupils of the projection lenses 6, 7 and 8 can be formed in the viewing space. In this way it is achieved that the envelopes of the light distributions, in the same way as shown in FIG. 4, are directed towards the viewer instead of being disposed transversely of the projection screen, which is particularly important in the case of small vertical viewing angles. In order to achieve this imaging, the corresponding lenses 20, 25 must be slightly offset from each other by an increasing distance determined from the center of the screen towards the edges.

In order to avoid Moiré effects as a result of interference of the television lines, produced by the cathode-ray tubes, with the horizontally extending cylindrical lenses 20 in FIG. 2 or lenses 20, 25 in FIG. 7, steps must be taken to ensure that the television lines adjoin each other closely enough which may be achieved by adapting the thickness of the television lines electron-optically. Moreover, the period of the lens structure 20 or 25 must be sufficiently small.

In an embodiment of the projection screen with a lenticular structure, the substrate is made of polymethylmethacylate having a refractive index $n_1 = 1.5$. the light-diffusing fibres are glass fibres with a refractive index $n = 1.6$ and a thickness of approximately 100 micrometers. The cylindrical lenses on the rear and, as the case may be, on the front of the screen have a radius of curvature of approximately 1.5 mm and the period of the lens structure is 0.5 mm. The screen has a thickness of 1.5 mm. This thickness ensures that the screen has a sufficient mechanical strength, in particular because the diffusion fibres constitute a kind of "reinforcement".

Figure 8:
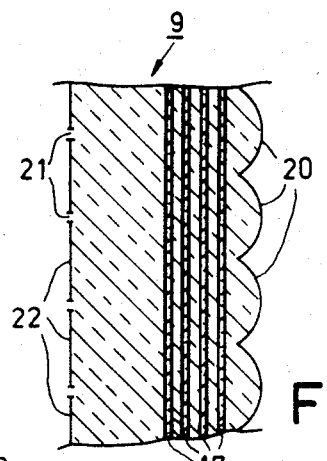
FIG. 8 shows an example of a reflective projection screen.

FIG. 8 is a vertical sectional view of an embodiment of an opaque or reflective projection screen. The cylindrical lenses 20 which diffuse the light in the vertical direction are now arranged on the front surface of the screen. The curvatures of these lenses and the thickness of the screen are such that the focal lines 21 of the lenses 20 are situated on the rear surface of the screen. At the location of these focal lines, the rear surface is reflective. The strips 22 between the focal lines, which strips are substantially wider than these focal lines, are black or light-absorbing.

Figure 9:
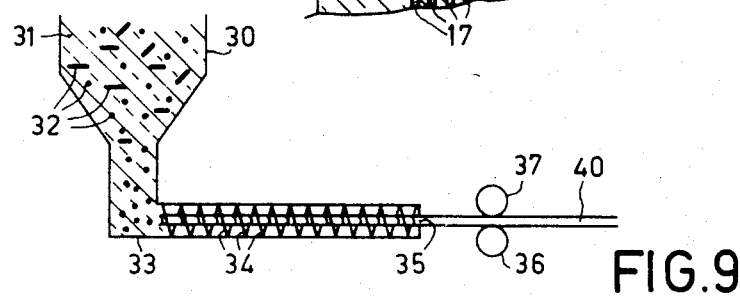
FIG. 9 illustrates a method of manufacturing the projection screen.

FIG. 9 schematically shows how a projection screen in accordance with the invention can be manufactured. Use is made of an extrusion process, known per se. A material 31, for example polymethylmethacrylate, contained in a hopper 30 is fed through a tube 33. This tube contains a screw 34 which compresses the material. At the same time, the material is heated to, for example, 260°. The material 31 is forced through a slit 35 and is then fed between a plurality of rollers 36 and 37, and cooled. In accordance with the invention, a second material, for example glass, in the form of filamentary particles 32 is introduced into the basic material 31. These particles, together with the basic material, are fed through the tube 33 and the slit 35, so that in the plate 40 which is ultimately obtained the particles are oriented in one direction.

By providing one of the rollers 36 and 37 with a surface which is the mirror-image of the afore-mentioned cylindrical-lens structure, the plate may be provided with this cylindrical-lens structure during the extrusion process.

Figure 10:
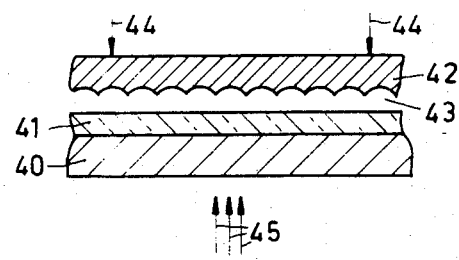
FIG. 10 shows a method of forming a lenticular structure on this screen.

For the formation of a lens structure on the plate 40, it is alternatively possible to employ a copying process, a die being pressed into a deformable material. FIG. 10 illustrates such a process. The plate 40 is covered with a sufficiently thick layer 41 of a suitably softened plastics which can be cured under the influence of heat, ultraviolet radiation or by cooling. In particular, photopolymerisable substances which cure under the influence of ultraviolet light are suitable for this purpose. In a die 41, a structure 43 is formed which is the mirror image of the lens structure to be formed. This die is pressed into the plastics layer 41, as indicated by the arrows 44. After this the plastics is allowed to cure, in the case of a transparent photopolymerizable substance, by exposure to ultraviolet light 45 through the plate 40. Finally, the die is removed and the projection screen is finished.

Alternatively, it is possible to manufacture the entire projection screen from a curable plastics. The basic material is a sufficiently thick layer of this plastics in soft condition. Filamentary particles 32 are introduced into this plastics, after which the plastics is allowed to cure. By pressing the die 42 shown in FIG. 10 into the plastics before curing, a projection screen with a substrate diffuser and a cylindrical-lens structure can be manufactured in a single process.

What is claimed is:

1. A projection screen for use in a color television projection system, comprising:
    a plate including a substrate formed of a transparent first material, the substrate having a first surface for entry of projected light projected from an image source and also having a second surface for exit of projected light which has traveled through the substrate, the second surface being oriented generally parallel to the first surface, characterized in that
    the substrate comprises diffusers for diffusing, in a first direction, projected light, the diffusers including filamentary particles disposed within the first material of the substrate, the filamentary particles being formed of a transparent second material having a refractive index differing from the refractive index of the first material, the longitudinal axes of the filamentary particles being oriented substantially in a second direction, the second direction being transversely to the first direction, so that projected light entering the first surface, traveling through the substrate and exiting the second surface is diffused in the first direction by means of the diffusers.

2. A projection screen as claimed on claim 1, characterized in that the substrate comprises a second diffuser inthe form of a multitude of substantially spherical particles of a material having a refractive index which differs from that of the substrate material.

3. A projection screen as claimed in claim 1, characterized in that the first surface is provided with a first structure of adjacent cylindrical lenses which extend in the first direction.

4. A projection screen as claimed in claim 3, characterized in that a Fresnel cylindrical lens is superimposed on the first structure of cylindrical lenses.

5. A projection screen as claimed in claim 3, characterized in that the second surface is provided with a second structure of adjacent cylindrical lenses which extend in the first direction, each cylindrical lens of the second surface being associated with a cylindrical lens of the first surface and the focus of a cylindrical lens of one of the plate surfaces being situated on the surface of the associated cylindrical lens of the other plate surface.

6. A projection screen as claimed in claim 3, 4 or 5, characterized in that strips of the second surface outside the focal lines of the cylindrical lens structure on the first surface are light-absorbing.

7. A projection screen as claimed in claim 1, characterized in that the second surface is provided with a structure of adjacent cylindrical lenses which extend in the first direction and whose focal lines are situated on the first surface, and areas on the first surface at the location of the focal lines are reflecting in the direction of the second surface, areas of the first surface situated between the focal lines being absorbing.

8. A color television projection system comprising a color television receiver connected to three cathode-ray tubes arranged in line, projection lenses associated with the cathode-ray tubes, and a projection screen arranged for receiving light projected by the projection lenses, characterized in that the projection screen is a screen as claimed in claim 2, 3, 4, 5, 7 or 1.

9. A projection screen for use in a color television projection system, comprising:
    a plate including a substrate formed of a transparent first material, the substrate having a first surface for entry of projected light projected from an image source and also having a second surface for exit of projected light which has traveled through the substrate, the second surface being oriented generally parallel to the first surface, characterized in that
    the substrate comprises diffusers for diffusing, in a first direction, projected light, the diffusers including filamentary particles disposed within the first material of the substrate, the filamentary particles being formed of a transparent second material having a refractive index differing from the refractive index of the first material, the longitudinal axes of the filamentary particles being oriented substantially in a second direction, the second direction being transversely to the first direction and being parallel to the first surface, so that projected light entering the first surface, traveling through the substrate and exiting the second surface is diffused in the first direction by means of the diffusers.

* * * * *